United States Patent [19]

Sugano et al.

[11] Patent Number: 4,577,270
[45] Date of Patent: Mar. 18, 1986

[54] PLANT CONTROL METHOD

[75] Inventors: Akira Sugano; Masaru Muramatsu; Sachio Yamanobe; Yoshio Sato, all of Hitachi, Japan

[73] Assignees: Hitachi, Ltd., Tokyo; Hitachi Engineering Co., Ltd., Ibaraki, both of Japan

[21] Appl. No.: 658,412

[22] Filed: Oct. 5, 1984

Related U.S. Application Data

[63] Continuation of Ser. No. 280,206, Jul. 6, 1981, abandoned.

[30] Foreign Application Priority Data

Jul. 4, 1980 [JP] Japan .................................. 55-90591

[51] Int. Cl.[4] ...................... G06F 15/46; G05B 13/04
[52] U.S. Cl. ................................ 364/151; 122/448 R; 364/164
[58] Field of Search ................................ 364/148-151, 364/160-163, 164, 165, 176; 122/448 R, 449, 479; 110/185, 186, 190, 191, 234, 101 C, 101 CF; 236/14, 15 E, 15 R

[56] References Cited

U.S. PATENT DOCUMENTS

| | | | |
|---|---|---|---|
| 3,617,717 | 11/1971 | Smith | 364/137 |
| 3,728,085 | 4/1973 | Horiguchi et al. | 364/164 X |
| 3,767,900 | 10/1973 | Chao et al. | 364/164 X |
| 3,876,871 | 4/1975 | Sinner | 364/151 |
| 3,877,636 | 4/1975 | Sato | 236/14 |
| 4,054,780 | 10/1977 | Bartley et al. | 364/164 X |
| 4,195,337 | 3/1980 | Bertrand et al. | 364/151 |
| 4,197,576 | 4/1980 | Sanchez | 364/151 |
| 4,335,683 | 6/1982 | Criswell et al. | 122/449 X |
| 4,346,433 | 8/1982 | Rutledge | 364/149 X |
| 4,349,869 | 9/1982 | Prett et al. | 364/149 X |

Primary Examiner—Joseph Ruggiero
Attorney, Agent, or Firm—Antonelli, Terry & Wands

[57] ABSTRACT

A plant model is constructed with a mathematical procedure known as the Kalman filter. The presumed value or predictive value of a certain parameter of a plant is compared with the actually-measured value of the parameter, and the state transition matrix and drive matrix of the Kalman filter are corrected. When a parameter which is a direct controlled object is difficult of actual measurement, the model is corrected by utilizing another parameter whose actual measurement value is easily obtained. When the plant has a feedback control system based on the proportional-plus-integral control, the gain of the system is corrected in correspondence with the corrections of the elements of the matrices.

19 Claims, 7 Drawing Figures

PLANT CONTROL METHOD

This is a continuation of application Ser. No. 280,206 filed July 6, 1981, now abandoned.

BACKGROUND OF THE INVENTION

This invention relates to a plant control method.

In order to operate, for example, a thermal power plant stably and at high efficiency, it is important that the temperature of main steam generated by a boiler is kept constant without being affected even by the disturbances of a load change etc. In starting the plant, the main steam temperature needs to be raised correctly in accordance with a predetermined heating curve.

To the end of enhancing the controllability, various systems have heretofore been developed. The inventors of the present application have also proposed the system of U.S. Pat. No. 3,877,636. The patented invention derives the desired value and predictive value of the main steam temperature after a predetermined time by means of a computer which mathematically models the the characteristics of a boiler, and controls the starting of the boiler so as to render the difference of both the desired and predictive values null. Although this system has achieved a certain result in the enhancement of the controllability, a more enhanced performance is desired. Further, the proposed system needs to be made applicable also to the steady load operation.

One of the reasons why a fully satisfactory performance is not obtained even with the aforecited invention is that the characteristics of the boiler cannot be correctly simulated. Another reason is that the characteristics vary depending upon the operating conditions.

SUMMARY OF THE INVENTION

An object of this invention is to propose a plant control method in which a model for simulating the characteristics of a plant is corrected with the actually-measured values of the plant in an on-line fashion, thereby to reproduce the plant characteristics more faithfully and to obtain more appropriate predictive values.

Another object of this invention is to provide a specific measure for realizing the plant control method of this invention for a boiler plant, the measure employing a secondary superheater as a model representative of the plant.

Still another object of this invention is to provide a specific measure for realizing the plant control method of this invention for a boiler plant whose fuel is coal, the measure employing a model of a coal mill conjointly.

DETAILED DESCRIPTION OF THE PREFERRED EMBODIMENT

Figure 1:
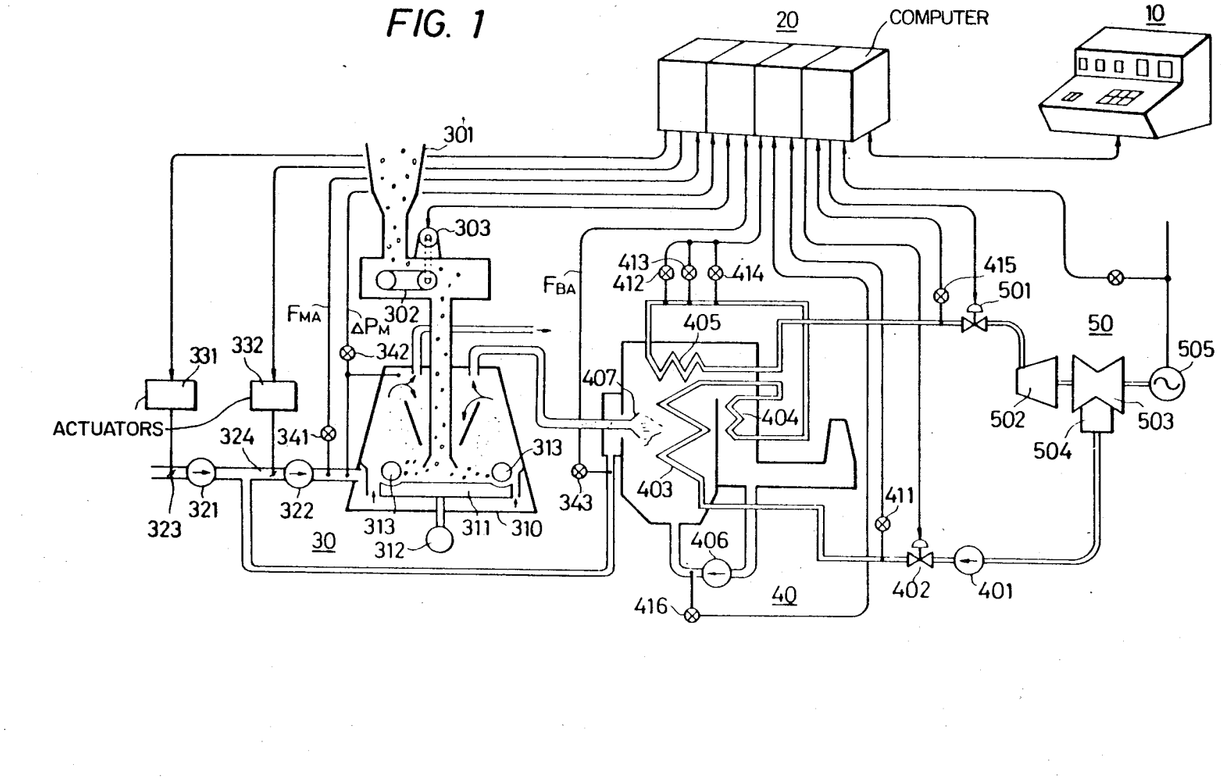
FIG. 1 is a schematic flow diagram showing a conceptual construction in which this invention is applied to a coal-burning thermal power plant.

FIG. 1 shows a conceptual construction at the time when this invention is applied to a coal-burning thermal power plant. Numeral 10 designates a console, numeral 20 a computer, numeral 30 a coal mill system, numeral 40 a boiler system, and numeral 50 a turbine generator system.

The operator of the thermal power plant executes necessary operations on the console 10 with reference to data in various parts of the plant transmitted through the computer 20, and data transmitted from a higher-ranked control station such as central load-dispatching office which is not shown, etc. The computer 20 gives the various parts of the plant necessary control signals which have been prepared from the data of the various parts of the plant, signals responsive to the operations of the console 10, etc. in accordance with a program stored in advance. The coal mill system 30 is constructed of a coal bunker 301, a coal feed belt 302, a belt driving motor 303, a mill 310, blowers 321 and 322, and dampers 323 and 324. The mill 310 consists of a table 311, a table driving motor 312, and a plurality of balls 313. Coal supplied from the bunker 301 through the belt 302 into the mill 310 is pulverized between the table 311 and the balls 313. Air is blown into the mill 310 by the blowers 321 and 322, and the coal pulverized into fine powdery coal is conveyed by the air to the burner of a boiler to be described later. In order to control the quantity of the coal, the motor 303 is controlled by the computer 20. In order to control the quantity of the air, the dampers 323 and 324 are controlled by respective actuators 331 and 332 which are operated by the outputs of the computer 20. An air pipe is branched between the blower 321 and the damper 324, to feed air which is supplied around the burner of the boiler. Data relevant to the mill, the quantity of the air to be blown into the mill ($F_{MA}$), a mill differential pressure ($\Delta P_M$) being the pressure difference between a mill inlet pressure and a mill internal pressure, and the quantity of the air to be fed around the burner ($F_{BA}$) are respectively detected by sensors 341, 342 and 343, and the detected signals are transmitted to the computer 20.

The boiler system 40 is constructed of a feed water pump 401, a feed water control valve 402, an evaporator 403, a primary superheater 404, a secondary superheater 405, a gas recirculating blower 406 and a burner 407. Water supplied from the feed water pump 401 is turned into steam by the evaporator 403. The steam is turned by the primary and secondary superheaters 404 and 405 into main steam which is superheated steam and which is supplied to the turbine generator system 50 to be described later. The quantity of heat supplied by the burner 407 is used for turning the water into the steam by the evaporator and turning the steam into the superheated steam by the superheaters, and partially escapes from a chimney into the atmospheric air along with an emission gas. Part of the gas to be emitted from the chimney is returned to the boiler by the gas recirculating blower 406. In order to control the flow rate of the steam which the boiler supplies, the control valve 402 is operated by the output of the computer 20. As data relevant to the boiler for controlling the temperature of the main steam, the quantity of the feed water, the outlet temperature of the primary superheater, the outlet pressure thereof, the outlet steam flow rate thereof, the main steam temperature and the gas recirculation flow rate are respectively detected by sensors 411, 412, 413, 414, 415 and 416, and the detected signals are transmitted to the computer 20.

The turbine generator system 50 is constructed of a turbine control valve 501, a high-pressure turbine 502, a medium- and low-pressure turbine 503, a steam condenser 504, and a generator 505 directly coupled to a turbine rotor. The control valve 501 is operated by the output of the computer 20, and the main steam in an amount corresponding to the degree of opening of the valve is supplied to the turbines 502 and 503 to rotate the generator 505. The steam having finished its work in the turbines is turned back into water by the condenser 504. This water is supplied to the boiler again by the feed water pump 401 stated before. A generator output is detected by a sensor 509, and the detected signal is transmitted to the computer 20.

The computer 20 is given various requests concerning the plant operation from the console 10, and delivers predetermined control signals on the basis of the data received from the plant and the program stored in advance. In the embodiment of FIG. 1, the computer 20 contains therein a computation model of the mill system 30 and a computation model of the boiler system 40. Each of the models utilizes a technique known as the Kalman filter, and has its precision enhanced. In the present embodiment, the models of the mill system 30 and the boiler system 40 are formed as being independent as will be described later. As to the mill system 30, the model is corrected on the basis of the actually-measured values and presumed values of the feed air quantity and the mill differential pressure, and the quantity of the fine powdery coal to be supplied to the boiler burner 407 is presumed. As to the boiler system 40, the model is corrected on the basis of the actually-measured value and presumed value of the main steam temperature, and the predictive value of the main steam temperature after a predetermined time is derived.

The model itself of this invention and the construction of a control system employing the model will be specifically described later.

Figure 2:
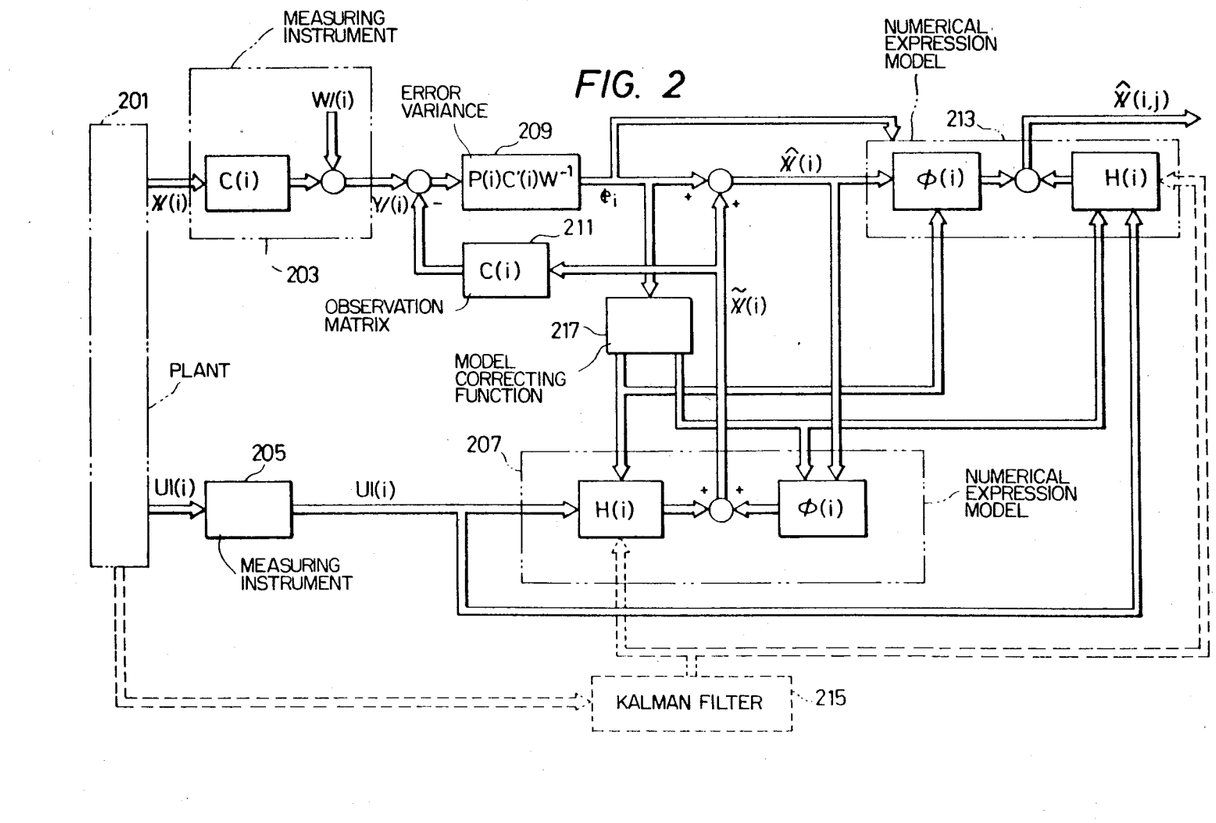
FIG. 2 is a block diagram for explaining the fundamental concept of this invention according to which the model of a plant is constructed and corrected by exploiting the idea of a Kolman filter.

FIG. 2 is a block diagram for explaining the fundamental concept according to which the model of the plant is constructed and corrected by exploiting the idea of the Kalman filter in this invention.

Numeral 201 designates the controlled plant or system for which the model is to be constructed, and the dynamic characteristic of which is supposed to be expressed by the following state transition equation:

$$\chi(i+1) = \phi(i)\cdot\chi(i) + H(i)\cdot u(i) \quad (1)$$

where $\chi(i)$: value of an n-dimensional state vector at a time i.

$\phi(i)$: (n×n)-dimensional state transition matrix.

$H(i)$: (n×r)-dimensional drive matrix.

$u(i)$: r-dimensional probability variable vector representative of system noise.

The noise vector $u(i)$ is assumed to be the white random noise which is its average value and dispersion expressed as follows:

$$E\{u(i)\} = u(i) \quad (2)$$

$$E\{u(i)-u(i)\}\{u(j)-u(j)\}' = \delta_{ij} U \quad (3)$$

where

U: (r×r)-dimensional positive fixed value matrix.

$$\delta_{ij} = \begin{cases} 1 \text{ for } i = j \\ 0 \text{ for } i \neq j \end{cases}$$

{ }': transposition.

Numerals 203 and 205 indicate measuring instruments, which derive the state vector $\chi(i)$ and the noise vector $u(i)$ in Equation (1) respectively. Here, the measuring instrument 203 is supposed to have the following observation equation:

$$y(i) = C(i)\cdot\chi(i) + w(i) \quad (4)$$

where $y(i)$: m-dimensional observation vector.

$C(i)$: (m×n)-dimensional observation matrix.

$w(i)$: m-dimensional observation noise vector.

The observation noise vector $w(i)$ is also supposed to be the white random noise and to have properties similar to those indicated in Equations (2) and (3). In addition, the observation noise vector $w(i)$ is assumed to be independent of the system noise vector $u(i)$ and the initial value vector $\chi(O)$. Stated differently, the noise vector $u(i)$ is a kind of disturbance acting on the system.

Numeral 207 indicates a numerical expression model of the plant, the state transition equation of which is given by the aforecited equation (1). It is the so-called Kalman filter that executes the following mathematical operation by exerting the most probable presumed value $\hat{\chi}$ of the state vector $\chi(i)$ on the state transition equation $\phi(i)$ and exerting the noise vector $u(i)$ on the drive matrix $H(i)$:

$$\hat{\chi}(i) = \tilde{\chi}(i) + e \quad (5)$$

$$= \tilde{\chi}(i) + P(i)C'(i)W^{-1}[y(i) - \{C(i)\tilde{\chi}(i) + \overline{w(i)}\}]$$

where $e$ denotes an error vector, and $\tilde{\chi}(i)$ the presumed quantity of the model.

$$\tilde{\chi}(i) = \Phi(i-1)\hat{\chi}(i-1) + H(i-1)\overline{u(i-1)} \quad (6)$$

$$P(i) = \{M^{-1}(i) + C'(i)W^{-1}C(i)\}^{-1} \quad (7)$$

$$M(i) = \Phi(i-1)P(i-1)\Phi'(i-1) + H(i-1)U(i-1)H'(i-1) \quad (8)$$

$$\text{Initial conditions: } \tilde{\chi}(0) = \overline{\chi(0)} \atop M(0) = \chi(0) \quad (9)$$

Numerals 209 and 211 in FIG. 2 indicate an error variance and an observation matrix for calculating Equation (5), respectively. C(i) of the observation matrix 211 is identical to the observation matrix C(i) of the measuring instrument 203.

Numeral 213 indicates a numerical expression model of the plant. Although this model is essentially the same as the model 207, it delivers the most probable predictive value $\hat{\chi}(i, j)$ after j samplings instead of the most probable presumed value $\hat{\chi}(i)$ at the present time (i). That is:

$$\hat{\chi}(i,j) = \tilde{\hat{\chi}}(i,j) + \text{(e}(i) \quad (10)$$

where $$\tilde{\hat{\chi}}(i,j) = \phi(i)\hat{\chi}(i,j-1) + H(i)\omega(i) \quad (11)$$

$j = 1, 2, \ldots n$

The other conditions are the same as in the aforecited operation as the Kalman filter.

A block 215 indicated by a broken line in FIG. 2 is another Kalman filter. It is meant that a most probable presumed value by the Kalman filter 215 may well be used as one of noise vectors in the Kalman filters indicated blocks 207 and 213. In order to simplify the state transition equation of the plant, the plant may be considered a combination of appropriate units into which the plant is divided. In the example of FIG. 1 in which this invention is applied to the plant, the boiler system is made the model unit for predicting the main steam temperature, while the mill system is made the model unit for presuming the coal quantity to be supplied from the mill to the boiler. The details of this fact will be described later.

Numeral 217 indicates a model correcting function provided in this invention. It serves to continually correct the model in order to attain a higher control precision when the plant is controlled by utilizing the mathematical method known as the Kalman filter. An example of the model correcting function will be described with reference to FIG. 3.

Figure 3:
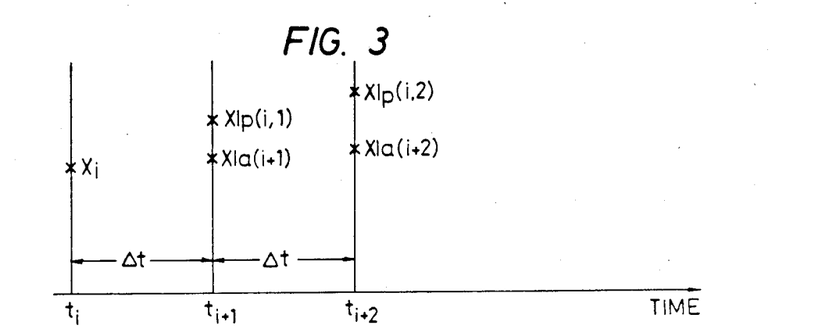
FIG. 3 is a graph for explaining the idea of the model correction in FIG. 2.

In FIG. 3, the abscissa represents the time, and $t_i$, $t_{i+1}$ and $t_{i+2}$ indicate the sampling times of the state vector $\chi$ as are respectively spaced time intervals $\Delta t$. The ordinate represents the actually-measured value and predictive value of the state vector. As given by Equation (1), the state transition equation of the plant is as follows:

$$\chi(i+1) = \phi(i)\chi(i) + H(i)\omega(i)$$

At the present time $t_i$, the predictive values at the times $t_{i+1}$ and $t_{i+2}$ or vectors $\chi_p(i, 1)$ and $\chi_p(i, 2)$ become as follows respectively:

$$\chi_p(i, 1) = \phi(i)\chi(i) + H(i)\omega(i) \quad (12)$$

$$\chi_p(i, 2) = \phi(i)\chi(i, 1) + H(i)\omega(i) \quad (13)$$

On the other hand, letting $\chi_a(i+1)$ and $\chi_a(i+2)$ denote the actual observation values from the plant at the respective times, the corresponding error vectors (e are as follows:

$$\text{(e}(i+1) = \chi'_a(i+1) - \chi_p(i, 1) \quad (14)$$

$$\text{(e}(i+2) = \chi_a(i+2) - \chi_p(i, 2) \quad (15)$$

By subtracting (14) from (15) and then substituting (12) and (13), $$\text{(e}(i+2) - \quad (16)$$
$$\text{(e}(i+1) = \chi_a(i+2) - \chi_a(i+1) - \Phi(i)\{\chi(i,1) - \chi(i)\}$$

$$\therefore \Phi(i) = \frac{\text{(e}(i+1) - \text{(e}(i+2) + \{\chi_a(i+2) - \chi_a(i+1)\}}{\chi(i,1) - \chi(i)} \quad (17)$$

If the state transition equation $\phi(i)$ is the optimum, $\{\text{(e}(i+1) - \text{(e}(i+2)\}$ in Equation (17) ought to have become zero. Letting $\phi_{MS}$ denote a state transition matrix at this time, $$\Phi_{MS}(i) = \frac{\chi_a(i+2) - \chi_a(i+1)}{\chi(i,1) - \chi(i)} \quad (18)$$

The error vector $\phi'(i+1)$ at the time when the prediction is made by the use of the matrix $\phi_{MS}$ becomes as follows:

$$e_{MS}(i+1) = \chi_a(i+1) - \phi_{MS}(i)\chi(i) - H(i)\omega(i) \quad (19)$$

If the drive matrix H(i) is the optimum, the error vector (e $(i+1)$ ought to have become zero. Letting $H_{MS}(i)$ denote the drive matrix at this time, $$H_{MS}(i) = \frac{\chi_a(i+1) - \Phi_{HS}(i)\chi(i)}{\omega(i)} \quad (20)$$

That is, every sampling of the state vector, the actually-measured value and the predictive value are compared, and the state transition matrix $\phi_{MS}(i)$ and the drive matrix $H_{MS}(i)$ respectively satisfying Equation (18) and Equation (20) are introduced into the models 207 and 213, whereby the most probable presumed value $\hat{\chi}(i)$ and most probable predictive value $\hat{\chi}(i, j)$ at higher precision can be obtained.

In order to solve Equations (18) and (20), repeated operations are necessary. Accordingly, not only the computer needs to be large-sized, but also a long period of time is taken for the operations. In order to avoid this drawback, that one of the elements of the system which is the most liable to involve errors in modeling may be noticed and corrected. When, for example, the boiler system is considered, the heat transfer rate $\alpha$ in the state transition matrix $\phi(i)$ and the quantity of heat generation $H_u$ in the drive matrix H(i) shall be respectively corrected by integral calculations as follows:

$$\alpha = \int\{(\text{e}(i+2) - \text{(e}(i+1)\}dt \quad (21)$$

$$H_u = \int \text{(e}_{MS}(i+1)dt \quad (22)$$

While the above model corrections are based on the predictive values, presumed values may well be relied on as stated below.

The error vector is calculated from the presumed value and the actually-measured value every sampling, and it is handled similarly to the error vector in Equations (21) and (22) so as to correct the heat transfer rate $\alpha$ and the quantity of heat generation $H_u$. The model which requires to prediction calculation is preferably constructed in this manner because the operation time for the prediction can be saved. The presumed values and error vectors in this case are as follows, and can be processed in the same way as in the foregoing idea:

$$\chi_m(i-1) = \phi(i-2)\chi(i-2) + H(i-2)\omega(i-2)$$

$$\chi_m(i) = \phi(i-2)\chi(i-1) + H(i-2)\omega(i-2)$$

$$\text{(e}(i-1) = \chi_a(i-1) - \chi_m(i-1)$$

$$\text{(e}(i) = \chi_a(i) - \chi_m(i)$$

There will now be described specific examples in which the fundamental idea of this invention above described is applied to the thermal power plant shown in FIG. 1. First, the application to the prediction of the main steam temperature in the boiler system will be described.

Figure 4:
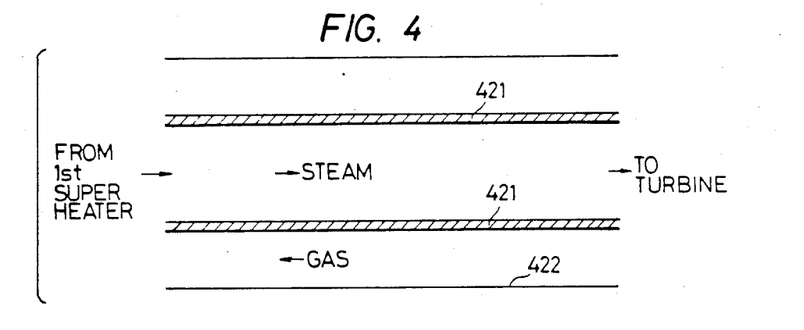
FIG. 4 is a simplified structural view of a secondary superheater.

FIG. 4 is a simplified structural view of the secondary superheater in which the secondary superheater is considered as a concentrated constant in order to simplify the model. In the figure, numeral 421 designates the metal pipe of the secondary superheater, and numeral 422 an outer wall. The main steam flows inside the metal pipe, and the gas flows between the pipe and the outer wall. Here, the following equation holds:

From the law of conservation of energy, $$V_{S2\,SH} \cdot \gamma_{S2\,SH} \frac{d H_{S2\,SH}}{dt} = (H_{S1\,SH} - H_{S2\,SH}) \cdot F_{S2\,SH} + A_{S2\,SH} \cdot \alpha_{mS2\,SH}(\theta_{m2\,SH} - \theta_{S2\,SH}) \quad (23)$$

where $V_{S2\,SH}$; volume of the internal fluid of the secondary superheater.

$\gamma_{S2\,SH}$; specific weight of the internal fluid of the secondary superheater.

$H_{S2\,SH}$; enthalpy of the internal fluid of the secondary superheater.

$F_{S2\,SH}$; flow rate of the internal fluid of the secondary superheater.

$\theta_{S2\,SH}$; temperature of the internal fluid at the outlet of the secondary superheater (steam temperature).

$\theta_{m2\,SH}$; average temperature of the metal of the secondary superheater.

$A_{S2\,SH}$; heat transfer area of the secondary superheater.

$\alpha_{mS2SH}$; rate of heat transfer from the secondary superheater to the internal fluid $$= \alpha_{mS2SH,\,r}(F_{S2SH}/F_{S2SH,\,r})^{0.8} \quad (24)$$

$\alpha_{mS2SH,\,r}$; rate of heat transfer from the metal to the internal fluid in a rated state.

$F_{S2SH,\,r}$; flow rate of the internal fluid of the secondary superheater in the rated state.

$H_{S1SH}$; enthalpy of the internal fluid at the inlet of the secondary superheater.

On the other hand, for the metal of the secondary superheater, the following equation holds from the law of conservation of energy:

$$M_{m2\,SH} \cdot C_{m2\,SH} \frac{d\,\theta_{m2\,SH}}{dt} = A_{S2\,SH} \cdot \alpha_{gm2.SH}(\theta_{gS2\,SH} - \theta_{mS2\,SH}) - A_{S2\,SH} \cdot \alpha_{mS2\,SH}(\theta_{m2\,SH} - \theta_{S2\,SH}) \quad (25)$$

where $M_{m2SH}$; weight of the secondary superheater metal.

$C_{m2SH}$; specific heat of the secondary superheater metal.

$\theta_{g2SH}$; temperature of the external gas of the secondary superheater.

$\alpha_{gm2SH}$; rate of heat transfer from the external gas of the secondary superheater to the metal $$= \alpha_{gm2SH,\,r}(F_{gBF}/F_{gBF,\,r})^{0.8} \quad (26)$$

$\alpha_{gm2SH,\,r}$; rate of heat tranfer from the gas to the metal in a rated state.

$F_{gBF}$; flow rate of the boiler gas.

$F_{gBF,\,r}$; rated gas flow rate of the boiler.

In addition, the gas temperature $\theta_{g2SH}$ of the secondary superheater becomes:

$$\theta_{g2SH} = \frac{H_u \cdot F_f + H_a \cdot F_a + H_{grf} \cdot F_{grf} - \frac{K_1}{F_f K_2}\left[\left(\frac{H_u \cdot F_f}{C_{Pg} \cdot F_{gBF}} + 273\right)/100\right]^4}{C_{Pg} \cdot F_{gBF}} \quad (27)$$

where $H_u$; calorific power of the fual.
$F_f$; flow rate of the fuel.
$H_a$; ethalpy of the air.
$F_a$; flow rate of the air.
$H_{grf}$; enthalpy of the recirculation gas.
$F_{grf}$; flow rate of the recirculation gas.
$C_{Pg}$; specific heat of the gas.
$K_1, K_2$; constants.

Here, when Equation (23) is arranged by putting the specific heat at constant pressure to be $C_p = [\partial H/\partial \theta]_p$, the following equation is obtained:

$$dx_1/dt = A_{11}x_1 + A_{12}x_2 + B_{11}u_1 \quad (28)$$

where $x_1 = \theta_{s2SH}$
$x_2 = \theta_{m2SH}$
$U_1 = \theta_{s1SH}$
$A_{11} = -[C_p F_s + A_{s2SH}\alpha_{ms2SH,\,r}(F_{s2SH}/F_{s2SH,\,r})^{0.8}]/(V_{s2SH}\cdot\gamma_{s2SH}\cdot C_p)$
$A_{12}: A_{s2SH}\cdot\alpha_{ms2SH,\,r}(F_{s2SH}/F_{s2SH,\,r})^{0.8}/(V_{s2SH}\cdot\gamma_{s2SH}\cdot C_p)$
$B_{11}: C_p F_{s2SH}/(V_{s2SH}\cdot\gamma_{s2SH}\cdot C_p)$ When Equation (25) is similarly generalized, the following equation is obtained:

$$dx_2/dt = A_{21}x_1 + A_{22}x_2 + B_{22}u_2 \quad (29)$$

where $u_2 = \theta_{g2SH}$
$A_{21} = A_{s2SH}\cdot\alpha_{ms2SH,\,r}(F_{s2SH}/F_{s2SH,\,r})^{0.8}/(M_{m2SH}C_{m2SH})$
$A_{22} = -[A_{s2SH}\cdot\alpha_{ms2SH,\,r}(F_{gBF}/F_{gBF,\,r})^{0.6} + A_{s2SH}\cdot\alpha_{ms2SH,\,r}(F_{s2SH}/F_{s2SH,\,r})^{0.8}]/(M_{m2SH}\cdot C_{m2SH})$
$B_{22} = A_{s2SH}\alpha_{gm2SH,\,r}(F_{gBF}/F_{gBF,\,r})^{0.6}/(M_{m2SH}\cdot C_{m2SH})$ Equations (28) and (29) are state equations indicative of the characteristics of the secondary superheater. As the secondary-superheater gas temperature $\theta_{g2SH}$, the aforecited empirical equation (27) is used.

When the state transition equation of the secondary superheater is given by the following as described before, $$(i+1) = \phi(i)\ (i) + H(i)\ (i) \quad (30)$$

the state transition matrix $\phi(t)$ and the drive matrix $H(t)$ are given by the following equations:

$$\phi(t,t_0) = L^{-1}[sI-A]^{-1}$$
$$H(t,t_0) = \int_{t_0}^{t} \phi(t,r)B(r)dr \quad (31)$$

Substituting Equations (28) and (29) into Equation (30), $$\phi(t,t_0) = \begin{bmatrix} \phi_{11} & \phi_{12} \\ \phi_{21} & \phi_{22} \end{bmatrix} \quad (32)$$

$$= \begin{bmatrix} [(\lambda_1 - A_{22})e^{\lambda_1 \Delta t} + (A_{22} - \lambda_2)e^{\lambda_2 \Delta \eta}]/D, \\ A_{12}(e^{\lambda_1 \Delta t} - e^{\lambda_2 \Delta \eta})/D \\ A_{21}(e^{\lambda_1 \Delta t} - e^{\lambda_2 \Delta \eta})/D, \\ [(\lambda_1 - A_{11})e^{\lambda_1 \Delta t} + (A_{11} - \lambda_2)e^{\lambda_2 \Delta \eta}]/D \end{bmatrix}$$

$$H(t,t_0) = \begin{bmatrix} h_{11} & h_{12} \\ h_{21} & h_{22} \end{bmatrix} \quad (33)$$

$$= \begin{bmatrix} \left[\frac{\lambda_1 - A_{22}}{\lambda_1}(e^{\lambda_1 \Delta t} - 1) - \frac{\lambda_2 - A_{22}}{\lambda_2}(e^{\lambda_2 \Delta t} - 1)\right]B_{11}/D, \\ A_{12}\left(\frac{e^{\lambda_1 \Delta t} - 1}{\lambda_1} - \frac{e^{\lambda_2 \Delta t} - 1}{\lambda_2}\right)B_{22}/D \\ A_{21}\left(\frac{e^{\lambda_1 \Delta t} - 1}{\lambda_1} - \frac{e^{\lambda_2 \Delta t} - 1}{\lambda_2}\right)B_{11}/D, \\ \left[\frac{\lambda_1 - A_{11}}{\lambda_1}(e^{\lambda_1 \Delta t} - 1) - \frac{\lambda_2 - A_{11}}{\lambda_2}(e^{\lambda_2 \Delta t} - 1)\right]B_{22}/D \end{bmatrix}$$

where $$\lambda_1, \lambda_2: \text{characteristic value of } [SI-A] = (A_{11} + A_{22} \pm D)/2 \quad (34)$$
$$D = \sqrt{(A_{11} + A_{22})^2 - 4(A_{11} \cdot A_{22} - A_{12} \cdot A_{21})}$$
$$\Delta t = t - t_0: \text{sampling period}$$

By introducing them into Equations (5)–(8), the [Karman]—Kalman—filter can be constructed.

In this manner, the boiler system is put into the numerical expression model by the Kalman filter, whereby the most probable presumed value and predictive value of the main steam temperature can be obtained. Since, in the embodiment of this invention, the main steam temperature can be precisely measured actually, the heat transfer rates $\alpha_{mS2SH}$ and $\alpha_{gm2SH}$ included in the state transition matrix $\phi(i)$ are corrected and also the calorific power $H_u$ included in the term of the drive matrix $H(i)$ is corrected on the basis of the actually-measured values and predictive values and by the method explained with reference to FIG. 3, thereby permitting the presumption and prediction at higher precision. Of course, since the heat transfer rates are also included in the drive matrix $H(i)$ as apparent from Equations (32) and (33), these parameters in $H(i)$ are corrected in the aforecited corrections.

Figure 5:
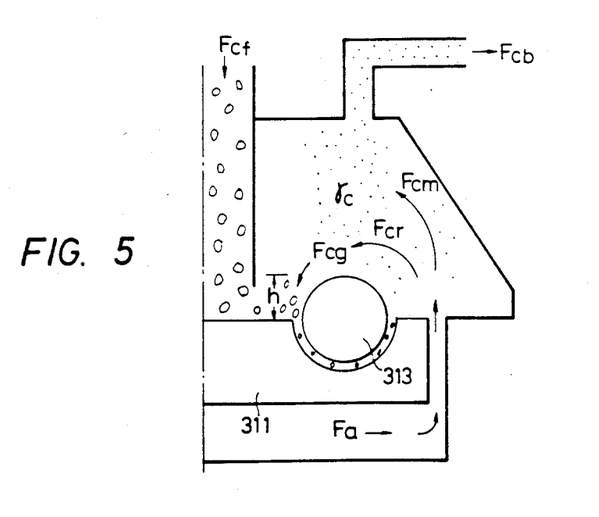
FIG. 5 is a simplified structural view of a mill system.

Now, the mill system will be described. In the mill system, it is essentially necessary to correctly presume the quantity of coal to be supplied to the burner. Since, however, the quantity of coal feed cannot be precisely measured, the quantity of primary air and the mill differential pressure (the difference between the pressure of the feed air to the mill and that of the air inside the mill) which can be measured comparatively precisely are also presumed and are used for model corrections so as to obtain a desired coal feed presumed value.

FIG. 5 is a constructional view of a simplified mill model. Here, the following equation holds:

$$A(dh_c/dt) = F_{cf} + F_{cr} - F_{cg} \quad (35)$$

where
$$F_{cg} = \beta_g N_m^2 h_c$$
$$F_{cr} = \alpha_g F_{cg} = \alpha_g \beta_g N_m^2 h_c$$

$$\therefore A(dh_c/dt) = F_{cf} + (\alpha \beta N_m^2 - \beta N_m^2) h_c \quad (36)$$

$F_{CF}$: quantity of coal feed to the mill.
$h_c$: height of coal in the mill.
$F_{cg}$: quantity of coal to be bitten between the balls and the table.
$F_{cr}$: quantity of coal to be recirculated.
$\beta_g$: rate of biting coal between the balls and the table.
$\alpha_g$: rate of recirculation.
$N_m$: table revolution speed (constant).
$A$: table area.

In addition, $$V = d\gamma_c/dt = F_{cm} - F_{cb} \quad (37)$$

where
$$F_{cm} = (1 - \alpha_g)F_{cg} = (1 - \alpha_g)\beta_g N_m^2 h_c$$
$$F_{cb} = \gamma_c F_a$$
$$\therefore V(d\gamma_c/dt) = (1 - \alpha_g)\beta_g N_m^2 h_c - F_a, r\gamma_c - \gamma_c, rF_a$$
$$K\gamma_c F_a = \Delta P_m$$
$$d\Delta P_m/dt = KF_a, rd\gamma_c/dt \text{ (where K: constant between i and (i+1))}$$

$$\therefore \frac{d\Delta P_m}{dt} = \frac{KF_{a,r}(1-\alpha_g)\beta_g N_m^2}{V}h_c - \frac{F_{a,r}\Delta P_m}{V} - \frac{KF_{a,r}\gamma_{c,r}}{V}F_a \quad (38)$$

where
$F_{CM}$: quantity of coal staying in the mill.
$F_{cb}$: quantity of coal to be supplied to the burner.
$\gamma_c$: density of coal in the mill.
$F_a$: quantity of air to be supplied to the mill.
$\Delta P_m$: mill differential pressure (air pressure at the mill inlet—air pressure in the mill).
$\gamma_{c, r}$: $\gamma_c$ during a rated operation.
$F_{a, r}$: $F_a$ during the rated operation.
$V$: internal capacity of the mill.

By arranging Equations (36) and (38), $$\frac{dx_2}{dt} = a_{21}x_1 + a_{22}x_2 + b_{22}u_2 \quad (39)$$

$$a_{21} = 0$$

$$a_{22} = \frac{\alpha_g \beta_g N_m^2 - \beta_g N_m^2}{A}$$

$$b_{22} = \frac{1}{A}$$

$$\frac{dx_1}{dt} = a_{11}x_1 + a_{12}x_2 + b_{11}u_1 \quad (40)$$

-continued $$a_{11} = \frac{-F_{a,r}}{V}$$

$$a_{12} = \frac{(1 - \alpha_g)\beta_g N_m^2 K F_{a,r}}{V}$$

$$b_{11} = \frac{-\gamma_{c,r} K F_{a,r}}{V}$$

It will be understood that, by bringing Equations (39) and (40) into correspondence with Equations (29) and (28), the Kalman filters can be correspondingly disposed also in the mill system likewise to the foregoing. For clarity, the corresponding relations of the variables in both the systems are listed below.

$x_1$: $\Delta P_m$ - - - $\theta_{S2SH}$
$x_2$: $h_c$ - - - $\theta_{m2SH}$
$u_2$: $F_{cf}$ - - - $\theta_{g2SH}$
$u_1$: $F_a$ - - - $\theta_{S1SH}$ In an embodiment of this invention, the correction values of the state transition matrix $\phi(i)$ and the drive matrix $H(i)$ as obtained by the foregoing method and noticed and are used for correcting also the gain of the feedback control system of the plant, whereby the control system is improved. It is now supposed that the feedback control system is a velocity type proportional-plus-integral control system. A computation equation is as given below:

$$P(i) = K_I(i) \cdot e(i, n) + K_p(i)\{e(i, n) - e(i-1, n)\} \quad (38)$$

where

P(i): proportional-plus-integral control output at the i-th sampling.
$K_I(i)$: integral control gain at the i-th sampling.
$K_p(i)$: proportional control gain at the i-th sampling.
e(i, n): predictive derivation of the main steam temperture after n samplings at the time of the i-th sampling = $T_{sp}(i, n) - T_{sms, p}(i, n)$
$T_{sp}(i, n)$: desired value of the main steam temperature after n samplings at the time of the i-th sampling.
$T_{sms, p}(i, n)$: predictive value of the main steam temperature after n samplings at the time of the i-th Assuming that the variation $\Delta T_{sms}$ of the main steam temperature versus the variation $\Delta F_t$ of the fuel flow rate conforms with the first-order lag characteristic (Equation (42)), the optimum control gains $K_p(i)$ and $K_I(i)$ are given as follows on the basis of the gain $K_g(i)$ and time constant $T_g(i)$ of the process at this time:

$$\Delta T_{sms}(i) = \frac{K_g(i)}{1 + T_g(i)s} \Delta F_t(i) \quad (42)$$

$$\left. \begin{array}{l} K_I(i) = \dfrac{1 - \beta}{K_g(i)[1 - e^{-\Delta t/T_g(i)}]} \\ K_p(i) = \dfrac{1}{K_g(i)[e^{\Delta t/T_g(i)} - 1]} \end{array} \right\} \quad (43)$$

where
s: Laplace operator.
$\beta$: constant.
$K_g(i) = B_{22}A_{12}(H_u - K_1K_2F_j{}^{k2-1})/[C_{PG}F_{GBF}(A_{11}A_{22} - A_{12}A_{21})]$
$T_{gv}(i) = -(A_{11} + A_{22})/(A_{11}A_{22} - A_{12}A_{21})$ Accordingly, $K_g(i)$ and $T_g(i)$ may be corrected similarly to the corrections of $\phi(i)$ and $H(i)$.

Figure 6:
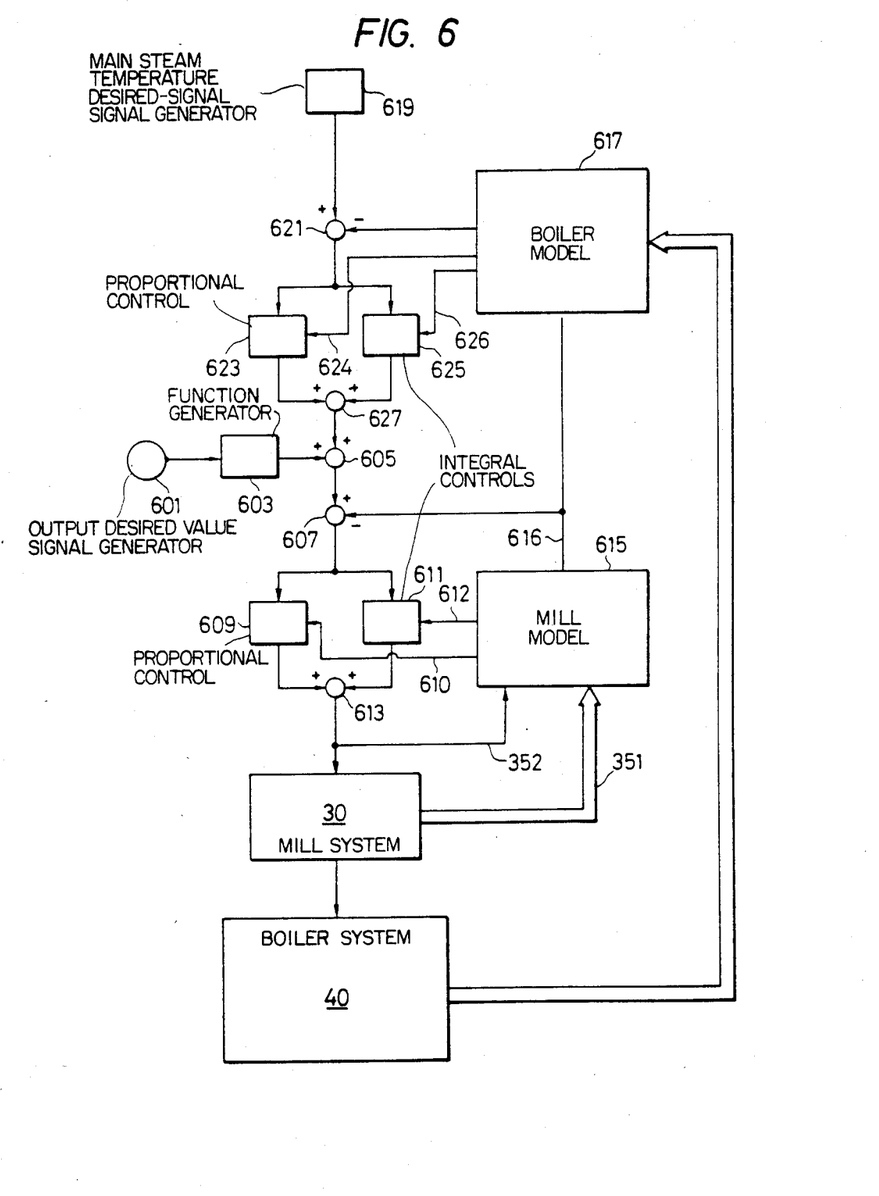
FIG. 6 is a flow diagram showing control blocks in the application of this invention to a thermal power plant.

To sum up, FIG. 6 illustrates the concept of the control blocks in the case of the application of this invention to the thermal power plant. Numeral 601 designates a portion for generating an output desired-value signal, which is converted into a coal feed quantity request signal by a function generator 603. Shown at numeral 605 is an adder, which adds the output of the function generator 603 and a correction signal given from an adder 627. Numeral 607 indicates an adder, which adds the output of the adder 605 and a coal feed quantity presumed value supplied from a mill model 615 through a line 616. Numerals 609 and 611 indicate proportional-plus-integral control portions, which are respectively supplied with correction signals from the model 615 through lines 610 and 612 so as to establish the gains given by Equation (43). An adder 613 adds the outputs of the control portions 609 and 611. Numeral 30 indicates the mill system, and the quantity of coal feed to this mill system is controlled by the output of the adder 613. The various data of the mill system are sampled into the mill model 615 through lines 351 and 352. Fuel is supplied from the mill system 30 to the boiler system 40. The various data of the boiler system are sampled into a boiler model 617 through a line 451. The coal feed quantity presumed value of the mill model is also sampled into the boiler model through the line 616. The main steam temperature predictive value after a predetermined time as obtained from the boiler model is compared by an adder 621 with a desired value after the predetermined time as given by a main steam temperature desired-value signal generator portion 619, and the difference is applied to proportional-plus-integral control portions 623 and 625. These control portions are supplied with correction signals from the model 617 through lines 624 and 626 so as to establish the gains given by the foregoing equation (43). The outputs of the respective control portions 623 and 625 are applied to the adder 627, the output of which is added to the coal feed quantity request signal as stated above and corrects this signal so as to eliminate an error in the main steam temperature.

Figure 7:
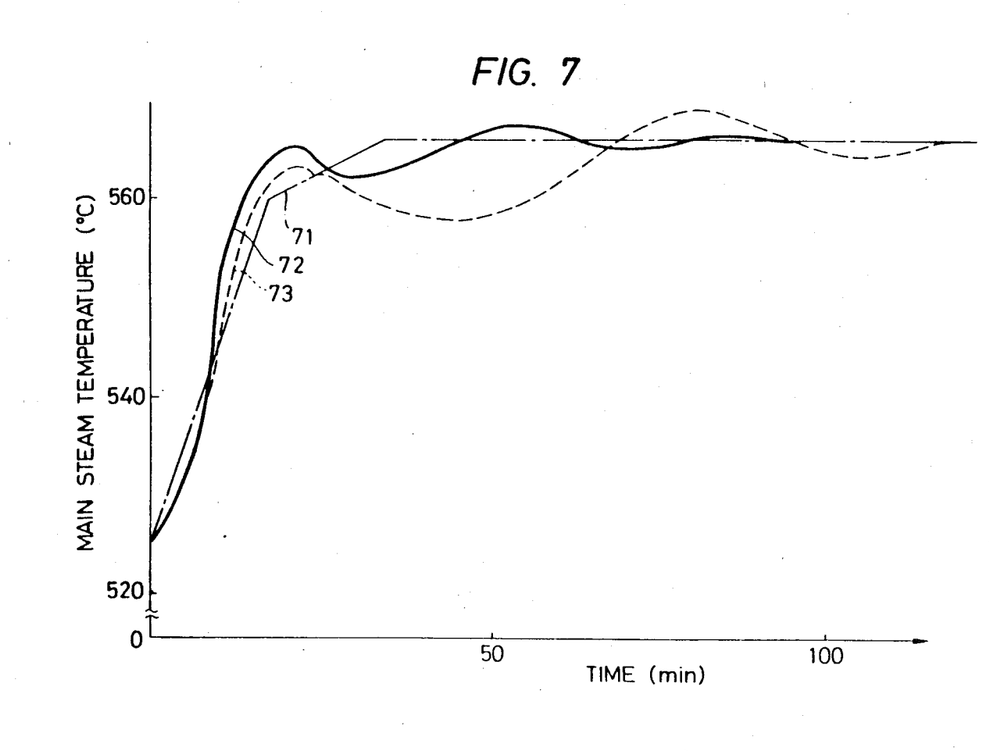
FIG. 7 is a waveform diagram for explaining the effect of this invention.

FIG. 7 is a waveform diagram for explaining the effect of this invention, and exemplifies a heating control in a thermal power plant. In the figure, numeral 71 designates a desired temperature rise curve, numeral 72 the curve of a control result according to the embodiment of this invention, and numeral 73 the curve of a control result according to an example of the U.S. patent cited before. As apparent from the comparison between the curves 72 and 73, the embodiment of this invention produces a better control result.

We claim:

1. A method of controlling and optimizing the operation of a process within a plant having at least one manipulated variable and at least one controlled variable dependent on said at least one manipulated variable, said method comprising the steps of;
measuring the present value of said at least one controlled variable;
calculating a present presumed value of said at least one controlled variable by using a first plant model formed by a mathematical procedure which uses said measured controlled variable and system noise included within said plant as data therefor;
evaluating an error corresponding to the difference between the measured value of said at least one controlled variable and said present presumed value thereof on the basis of noise included within said measured value and system noise included within said plant;

calculating a future predictive value of said at least one controlled variable by using a second plant model formed by a mathematical procedure which uses said present presumed value, said evaluated error and system noise included within said plant as data therefor;

correcting said first plant model in such a manner that said evaluated error becomes zero; and adjusting said at least one manipulated variable in accordance with said future predictive value and a desired value of said at least one controlled variable.

2. The method of controlling a process according to claim 1, wherein the process is controlled in such a manner that said desired value of said at least one controlled variable and said future predictive value corresponding to each controlled variable thereof, which is a value that the present presumed value should become after a predetermined period of time has elapsed by utilizing said corrected model, coincide with each other.

3. The method of controlling a process according to claim 1 wherein the process controlled is the operation of a boiler system, the temperature of main steam in the plant is selected as said at least one controlled variable and the first and second plant models of said boiler system include a heat transfer rate $\alpha$ and heat generation Hu by integral computations of errors.

4. The method of controlling a process according to claim 2 wherein the process being controlled is the operation of a boiler system, the temperature of main steam in the plant is selected as said at least one controlled variable and the first and second plant models of said boiler system include a heat transfer rate $\alpha$ and heat generation Hu by integral computation of errors.

5. The method of controlling a process according to claim 3 wherein said boiler system is represented by a model having a secondary superheater as a concentrated constant.

6. The method of controlling a process according to claim 4 wherein said boiler system is represented by a model having a secondary superheater as a concentrated constant.

7. The method of controlling a process according to claim 5 wherein an error corresponding to the difference between said future predictive value and said desired value is subjected to proportional and integral computations, the results of the computations being utilized in carrying out the operation of the boiler system.

8. The method of controlling a process according to claim 6 wherein an error corresponding to the difference between said future predictive value and said desired value is subjected to proportional and integral computations, the results of the computations being utilized in carrying out the operation of the boiler system.

9. A system for controlling and optimizing the operation of a process within a plant having at least one manipulated variable and at least one controlled variable dependent upon said at least one manipulated variable comprising;

means for measuring the present value of said at least one controlled variable;

means for measuring noise included within said plant;

means for calculating a present presumed value of said at least one controlled variable by using a first plant model formed by a mathematical simulation procedure which uses said measured controlled variable and said measured system noise;

means for evaluating an error corresponding to the difference between said measured value of said at least one controlled variable and said present presumed value thereof on the basis of measured noise included within said measured value;

means for calculating a future predictive value of said at least one controlled variable by using a second plant model formed by a mathematical simulation procedure which uses said present presumed value, said evaluated error and said measured plant noise;

means for correcting said first model in such a manner that said evaluated error becomes zero; and means for adjusting said at least one manipulated variable in accordance with said future predictive value and a desire value of said at least one controlled variable.

10. A system for controlling and optimizing the operation of a process within a plant in accordance with claim 9 wherein the process is controlled in such a manner that said desired value of said at least one controlled variable and said future predictive value corresponding to each controlled variable thereof, which is a value that the present presumed value should become after a predetermined period of time has elapsed by utilizing said corrected model, coincide with each other.

11. A system for controlling and optimizing the operation of a process within a plant in accordance with claim 9 wherein the process is the controlling of a boiler system, the temperature of main steam in the plant is selected as said at least one controlled variable and the first and second plant models of said boiler system include a heat transfer rate $\alpha$ and heat generation Hu by integral computation of errors.

12. A system for controlling and optimizing the operation of a process within a plant in accordance with claim 9 wherein the process is the controlling of a boiler system, the temperature of main steam in the plant is selected as said at least one controlled variable in the first and second plant models of said boiler system include a heat transfer rate $\alpha$ and the heat generation Hu by integral computation of errors.

13. A system for controlling and optimizing the operation of a process within a plant in accordance with claim 11 wherein said boiler system is represented in the first and second models with a secondary superheater as a concentrated constant.

14. A system for controlling and optimizing the operation of a process within a plant in accordance with claim 12 wherein said the boiler system is represented in the first and second models with a secondary superheater as a concentrated constant.

15. A system for controlling and optimizing the operation of a process within a plant having at least one manipulated variable and at least one controlled variable dependent upon said at least one manipulated variable;

means for measuring the present value of said at least one controlled variable;

means for measuring noise included within said plant;

means for calculating a present presumed value of said at least one controlled variable as a function of said measured controlled variable and system noise included within said plant;

means for evaluating an error corresponding to the difference between said measured value of said at least one controlled variable and said present presumed value thereof on the basis of measured noise included within said measured value;

means for calculating a future predictive value of said at least one controlled variable by using a plant model formed by a mathematical simulation procedure which uses said present presumed value, said evaluated error and system noise included within said plant as data therefor;

means for causing said evaluated error to become zero; and means for adjusting said at least one manipulated variable in accordance with said future presumed value and a desired value.

16. A system for controlling a boiler comprising:
a boiler system;
a mill system for milling combustible fuel to be fed to said boiler system;
means for calculating a present presumed value of the coal feed as a function of operational data from said mill system;
means for calculating a future predictive value of the main steam temperature as a function of operational data from said boiler system and said present presumed value of the coal feed;
a main steam desired value generator for producing a desired future main steam temperature signal;
means for producing a coal feed correction signal as a function of said future predictive value of steam temperature and said desired main steam temperature signal;
means for producing a coal feed request signal; and
means for controlling the quantity of coal fed to said mill system as a function of the present presumed value of the coal feed, the coal feed correction signal and said presumed value of the coal feed.

17. A system for controlling a boiler in accordance with claim 16 wherein
said means for calculating a future predictive value of the main steam temperature is a Kalman filter; and
said means for calculating a present presumed value of the coal feed is a Kalman filter.

18. A system for controlling a boiler in accordance with claim 17 wherein said means for producing a coal feed correction signal comprises:
an adder which is coupled to said main steam desired value generator and said means for calculating a future predictive value of the main steam temperature for producing a difference signal between said future main steam temperature and said future predictive value of main steam temperature;
a proportional control coupled to said difference signal for varying the gain of amplification of said difference signal in response to said means for calculating a future predictive value;
an integral control coupled to said difference signal for varying the gain of amplification of said difference signal in response to said means for calculating a future predictive value; and
means for adding the amplified difference signal produced by said proportional control and said integral control together to produce said coal feed correction signal.

19. A system for controlling a boiler in accordance with claim 19 wherein said means for controlling the quantity of coal fed to said mill system comprises:
an adder which is coupled to said means for producing said coal feed correction signal and said means for producing a coal feed request signal to produce the sum of said coal feed correction signal and said coal feed request signal;
an adder coupled to said sum of said coal feed correction signal and said coal feed request signal and to said present presumed value of the coal feed produced by said means for calculating a present presumed value of the coal feed to produce a difference signal between the present presumed value of the coal feed and the sum of said coal feed correction signal and said coal feed request signal;
a proportional control coupled to said difference signal produced by said adder of the difference signal between the present presumed value of the coal feed and the sum of said coal feed correction signal and said coal feed request signal for varying the gain of amplification of said difference signal in response to said means for calculating a present presumed value of the coal feed;
an integral control coupled to said difference signal produced by said adder of the difference signal between the present presumed value of the coal feed and the sum of said coal feed correction signal and said coal feed request signal for varying the gain of amplification of said difference signal in response to said means for calculating a present presumed value of the coal feed; and
means for adding the amplified difference signal between the present presumed value of the coal feed and the sum of said coal feed correction signal and said coal feed request signal produced by said proportional control and said integral control together to produce a control signal for controlling the feeding of coal to said mill.

* * * * *